Patented Feb. 16, 1932

1,845,785

UNITED STATES PATENT OFFICE

RALPH L. DODGE, OF CHARLESTON, WEST VIRGINIA, ASSIGNOR, BY MESNE ASSIGNMENTS, TO E. I. DU PONT DE NEMOURS & COMPANY, OF WILMINGTON, DELAWARE, A CORPORATION OF DELAWARE

PRODUCING NITROGEN AND HYDROGEN MIXTURES

No Drawing. Original application filed April 29, 1930, Serial No. 448,424. Divided and this application filed January 21, 1931. Serial No. 510,284.

This invention relates to the production of gaseous mixtures of nitrogen and hydrogen and more particularly to the production of such mixtures by the catalytic decomposition of ammonia, as set forth in my co-pending application, Ser. No. 448,424, filed April 29, 1930, of which the present application is a division.

It is known that ammonia can be decomposed into its elements, nitrogen and hydrogen, by subjecting it at an elevated temperature to contact with iron. This method of producing nitrogen and hydrogen is used with advantage where such gaseous mixtures are required for the testing of the efficiency of catalysts for the synthesis of ammonia from it element. Moreover, when employing synthetic ammonia as the raw material, this is a convenient way of readily obtaining hydrogen of a high degree of purity which may advantageously be employed under circumstances such that the presence of the relatively inert nitrogen is of little diasdvantage.

Iron alone exhibits some activity as a catalyst for the thermal decomposition of ammonia but when employed for any prolonged period at such elevated temperatures, say 500 to 700° C. for example, as are desirable for the effective conduct of the reaction, this material becomes powdered and sintered in such a way as to obstruct the passage of gas through the reaction tube. If, therefore, the decomposition of ammonia is to be effected continuously over a long period of time, it is necessary at rather frequent intervals to replace the iron with fresh material.

It is the object of the present invention to provide an improved process for producing gaseous mixtures of nitrogen and hydrogen by the thermal decomposition of ammonia, the process being characterized by the employment of improved catalysts possessing a high degree of activity and capable of use for long periods of time without disintegration.

Other objects and advantages of the invention will be apparent as it is better understood by reference to the following specification in which its details and preferred embodiments are described.

According to the present invention improved results are obtained in the production of gaseous mixtures of nitrogen and hydrogen by thermal decomposition of ammonia by combining a catalyst containing iron together with one or more oxides of the elements comprising the groups aluminum, zirconium, chromium, magnesium and calcium. By employing catalysts of this composition it is possible to effect the decomposition of ammonia more rapidly and at a lower temperature than with iron alone.

Although various methods may be used in the preparation of the catalyst and other ingredients than those named above may also be included if desired, I have found that for the best results the catalyst should be substantially free from elements of the alkali metal group or compounds thereof. For, although the alkali metals and their compounds are frequently used with advantage in catalytic compositions and in fact, due to the methods and the raw materials commonly employed in catalyst manufacture one or more of these elements are likely to be present, my experience has shown that it is advisable to take precautions to avoid the presence of alkali metals in the catalyst. In other words, it is preferred to avoid using such methods of preparation as would involve, for instance, the addition of any of the catalyst ingredients in the form of an alkali metal salt or if such catalyst be employed, to take steps to eliminate the alkali metal from the catalyst before it is used in the decomposition of ammonia. The presence of alkali metal in the catalyst tends to decrease the life thereof, apparently by sintering and fusing in such a way as to obstruct the free flow of gas through the body of contact material.

The catalysts herein described and methods for the preparation of which are set forth in the following examples are more active and generally satisfactory in the thermal decomposition of ammonia than iron alone. For example, I have carried on the decomposition of ammonia for as long as 500 hours without appreciable deterioration of the catalyst. While various methods of preparing the catalysts may be employed and the conditions under which they are used in decomposing ammonia may be varied within wide limits, the following examples are given to illustrate the manner of practicing the invention.

*Example 1.*—Mix a 10% solution of ferric sulphate with an equal volume of 10% solution of ammonium chromate and then add ammonium hydroxide to complete precipitation. Filter the precipitate, wash free from sulphates and dry. Form the dried material into briquets of suitable size and subject these to reduction by means of hydrogen at a temperature within the range of 300 to 550° C. In employing this catalyst in the thermal decomposition of ammonia it is disposed in a nickel or nichrome tube surrounded by an electrical heater. When ammonia gas is pressed over this catalyst at a temperature within the range of 600 to 700° C. the ammonia is decomposed into its elements and by suitably adjusting the rate of flow an efficient conversion of ammonia to nitrogen and hydrogen may be obtained. Any undecomposed ammonia may be removed from the gaseous products by one of the known ways, as, for example, by absorption in water or an acid.

*Example 2.*—A catalyst adapted for use in the manner indicated under Example 1 may be prepared by adding approximately 3% by weight of magnesium oxide and 3% by weight of aluminum oxide to pure ferroso ferric oxide, the percentages being based on the total catalytic material calculated as oxide. Melt the oxide mixture, allow it to cool and crush and screen it to suitable size. The catalyst is subjected to reduction before use.

*Example 3.*—The catalyst described in Example 1 may be replaced by one prepared by fusing ferroso ferric oxide with 2% by weight of zirconium oxide. The molten mixture is allowed to cool, crushed, screened to suitable size and then reduced.

No explanation or theory is offered as to any changes in physical form or chemical composition that may occur in the catalyst in the course of its reduction or during actual use. The term catalyst as employed in the claims is intended, therefore, to include the contact mass as prepared as well as any modified form in which it may exist during the reaction. It should also be understood that, since it is generally recognized that the activity of substances as catalysts is a function of the chemical elements contained therein rather than of the particular type of compound employed, the term oxide as employed herein is to be considered as including oxides as such or as they may be present in chemical combination with other elements.

While the temperature range of 600–700° C. indicated in the foregoing examples represents the preferred temperature range, the invention is not limited to the utilization of these temperatures. The reaction can actually be initiated and carried on at lower temperatures, but for efficient operation of the process I prefer to employ the elevated temperatures named. Higher temperatures may also be employed but, generally speaking, with some deterioration in the physical form of the catalyst.

Various changes may be made in the method described without departing from the invention or sacrificing any of the advantages thereof.

I claim:

1. The process of producing a mixture of nitrogen and hydrogen which comprises contacting gaseous ammonia at an elevated temperature with a catalyst comprising iron and zirconium oxide.

2. The process of producing a mixture of nitrogen and hydrogen which comprises contacting gaseous ammonia at a temperature within the range of 600 to 700° C. with a catalyst comprising iron and zirconium oxide.

3. The process of producing a mixture of nitrogen and hydrogen which comprises contacting gaseous ammonia at an elevated temperature with a catalyst consisting of iron and zirconium oxide, said catalyst being substantially free from alkali metal.

In testimony whereof, I affix my signature.

RALPH L. DODGE.